United States Patent [19]

Page et al.

[11] Patent Number: 5,324,472
[45] Date of Patent: Jun. 28, 1994

[54] METHOD OF PREPARING METALFLAKE PLASTIC

[76] Inventors: William Page, 129 Rainbow Ave., Rainsville, Ala. 35986; Bruce Muller, 10385 Crawford Rd., Homerville, Ohio 44235

[21] Appl. No.: 961,504

[22] Filed: Oct. 15, 1992

[51] Int. Cl.$^5$ .............................................. B29C 67/00
[52] U.S. Cl. ................................. 264/311; 264/114; 264/310
[58] Field of Search ................. 264/114, 310, 311, 109

[56] References Cited

U.S. PATENT DOCUMENTS

| | | | |
|---|---|---|---|
| 3,549,441 | 12/1970 | Mesinger et al. | 264/310 |
| 3,733,385 | 5/1973 | Reddish | 264/105 |
| 3,928,524 | 12/1975 | Leverett | 264/117 |
| 3,976,821 | 8/1976 | Carrow et al. | 264/114 |
| 4,238,537 | 12/1980 | Kerr | 264/310 |
| 4,294,793 | 10/1981 | Takazawa | 264/311 |
| 4,383,468 | 5/1983 | Sie et al. | 264/310 |
| 4,857,257 | 8/1989 | Chen et al. | 264/310 |
| 4,906,428 | 3/1990 | Kelly | 264/310 |

*Primary Examiner*—Mary Lynn Theisen
*Attorney, Agent, or Firm*—Welsh & Katz, Ltd.

[57] ABSTRACT

A process for producing a plastic article having a decorative appearance which comprises multiplane rotational molding polymer and additives, including decorative metalflake in such a manner as will evenly distribute the metalflake.

16 Claims, No Drawings

METHOD OF PREPARING METALFLAKE PLASTIC

This invention relates to a method of forming a hollow article such as a cycle saddle cover. More particularly, the invention relates to a method for rotationally molding a seamless hollow article from a fusible plastic material which allows for the introduction and dispersal of metalflake in the plastic in a uniform manner.

BACKGROUND OF THE INVENTION

Rotational molding and casting techniques are quite highly developed and are well known within the plastic industry. The rotational molding of synthetic resins in liquid and powdered form is likewise well known.

Rotational molding, in general, comprises the steps of introducing into the mold, a predetermined quantity of a normally solid thermoplastic polymer composition in the form of fine particles capable of coalescing and melting at an elevated temperature. The shell mold is constructed from a thermally conductive metal and has an interior surface shaped to substantially correspond with the shape of the casting to be produced. The predetermined quantity of said polymer composition is such as to be sufficient to form a continuous layer having the desired thickness for the finished molded part. The next step involves closing the shell mold and rotating the closed mold about at least two different axes of rotation. The revolving shell mold is heated with a hot fluid, e.g. hot gas, that contacts the outer shell mold wall and has a temperature above that temperature which causes melting of the polymer composition. The heating of the revolving shell mold is continued until a coherent and substantially uniform layer of the melted polymer composition has formed on the interior shell mold surface. The revolving shell mold is cooled, and the article formed in the mold is discharged.

Attempts to obtain a good decorative appearance on rotationally molded hollow plastic articles by incorporating decorative particles in the plastisol mix or plastic mixture used in the molding process are generally not fully satisfactory because it was found that the particles agglomerated together near or at the surface and great difficulty has been experienced in obtaining a uniform distribution of the decorative particles throughout the article wall.

SUMMARY OF THE INVENTION

An object of the invention is to provide improved processes for rotationally molding hollow articles which provide a greatly enhanced decorative appearance.

Another object of the subject invention is to substantially reduce costs by reducing the amount of expensive decorative particles used and gaining enhanced decorative appearance.

A further object of the subject invention is a process that can be carried out so as to produce in a single heat treatment an article with a substantially uniform dispersion of metalflake.

The method of subject invention involves the rotational molding of a mixture of ingredients, including a particulate thermoplastic polymer and additives such as an anti-static composition, including an emulsifying mixture, pigments, metallic flakes, and surfactant. These materials are placed into the mold, resin first and then the remainder of the additives. Next, the mold is closed, heated to a desired temperature, while being rotated about two axes (horizontal and vertical) in a specific pattern. Rotation and heating of the molds are continued until all of the pellets and powder have melted into a generally homogeneous mass and formed a generally uniform layer of melted plastic against the interior mold surface of the cavity walls. At this time, the mold is indexed or otherwise removed from the oven station of the molding apparatus to a cooling station.

Cooling can be accomplished, for instance, by spraying or pouring water onto the rotating molds and/or by circulating cold air over the molds. Cooling must be maintained until the article possesses sufficient strength to resist deformation that tends to occur upon opening of the molds and removing the formed articles. During the cooling cycle, the mold may be pressurized, while being cooled by first air, then water.

The completely cooled molds may then be indexed or otherwise removed from the cooling station of the apparatus and placed at a working station position, where the molds can be opened and the formed articles removed.

DETAILED DESCRIPTION OF THE INVENTION

The components of the mixture of the subject invention include the following elements of the composition: particulate polymer compositions having the required particle size and coalescing or melting properties known and available, in general, as commercial products, e.g. for general plastics molding purposes and may contain coloring and/or filler materials, cross-linking catalysts and other additives. Polymer compositions having a particle size of minus 20 mesh and preferably minus 35 mesh, are preferred. Examples of acceptable polymer compositions are polyolefins, for example polyethylene; especially preferred for many purposes of the invention are linear low-pressure and high pressure low-density polyethylene having a density of from 0.916 to 0.965, and preferably 0.935, and a melt index (M.I.) of 2.0 to 50.0 M.I. and preferably 5.0 M.I. Alternatively, polymers such as polypropylene, polycarbonate, polyacetal, and the like may be used.

Except where otherwise indicated, all parts indicated herein shall be parts by weight.

Also in the mixture is an emulsifier which comprises a mixture of glycerides. More specifically, the mixture is derived from a transesterification with glycerine of triglycerides wherein the fatty-acid portion of the triglycerides is approximately 65% stearic acid, 29% palmitic acid, 3% myristic, and the remainder being only minor amounts of different fatty acids, none more than 0.5% of the whole. The resulting mixture comprises 5–10% triglycerides, 52–55% monoglycerides, and 35–40% diglycerides, and has a melting point of 140° F. The glyceride mixture is added to the resin in an amount equal to 0.01 to 2.00 pts./100 pts. polyethylene and, more preferably, about 0.74 pts./100 pts. polyethylene. In the alternative, other emulsifiers, such as amine compounds, glycerol esters, or quaternary ammonium compounds may be used.

Another emulsifier utilized is caster wax in an amount of 0.001 to 1.000 pts. and preferably 0.25 pts./100 pts. polyethylene. In the alternative, natural paraffins, fatty acids amides, low molecular weight polyolefin waxes, and polyethylene glycols may be used. In combination with the glycerides and castor wax is a dispersant, such as amorphous fumed silica, which may be used in the amount of 0.001 to 1.000 and preferably about 0.01 pts./100 pts. polyethylene.

Pigments are added to give color to the finished product in the range of about 0.00 to 2.0 pts./100; preferably 0.1 pts./100 pts. polyethylene. Such pigments should be generally translucent.

In the method of the subject invention, decorative particles in the nature of metalflake are added to the mixture. Such decorative particles should be of a material compatible with the materials of the resulting plastic mixture and may be of various desired sizes and shapes. Preferably, the decorative particles are about 0.05 inches square and 0.002 inches thick in size. The metalflake itself may be aluminum foil coated with a thermoset epoxy resin and more particularly may be anodized aluminum flake having various colored lustrous surfaces and having a colored lacquer or epoxy for protection of the metal from reactions with the polymer and other additives.

In another embodiment, the metalflake may be of aluminum, copper, mylar, vinyl, etc., coated as above. The metalflake is added in the amounts of about 0.01 pts. to about 10 pts./100 pts. polyethylene, and preferably about 0.5 pts./100 pts. polyethylene.

A surfactant is added to the above mixture in the amounts of 0.02 pts. to 0.20 pts./100 pts. polyethylene. The surfactant may be a stearic acid metallic salt, and preferably zinc stearate; calcium stearate/magnesium stearate, barium stearate, aluminum stearate, and lithium stearate may also be used. Other examples of surfactants which might be used in the subject invention are alkanolamides, quaternary compounds, sulfate and sulfonate compounds, diester sulfur sulfosucinnate compounds. However, as stated above, preferably zinc stearate is used in the amount of 0.1 pts./100 pts. polyethylene.

In the method of the subject invention, the polymer, such as polyethylene, is placed in the unheated mold; the additives are mixed together and added to the polymer. The mold is closed and rotated at a slow rate of speed about 2 axes, 2 rpm about the horizontal and 1 rpm about the vertical axis on a cycle at a temperature of about 400°–750° F. Immediately thereafter, a second cycle is initiated where the rotational speed is increased to from 5 rpm to 15 rpm and at ratios of 2:1 to 8:1 (vertical:horizontal). The exact speed used in this second cycle will depend on the shape of the article being molded, as known in the art. For example, simple, straight-sided shapes can be rotated faster than intricate, curved shapes. After the two heating cycles, the mold is cooled while rotation is continued. The interior is generally pressurized while cooling to maintain the integrity of the shape being molded until the plastic can support itself. After cooling, the mold is opened and the article removed.

EXAMPLE 1

Starting with an empty open mold, a charge of 100 pts. of linear low density polyethylene having a density of 0.935 and 5.0 M.I. is introduced into the bottom half of the mold cavity. The remainder of the ingredients, the glyceride mixture, the castor wax, the amorphous fumed silica, the pigments, the metalflake, and the zinc stearate are then added together to form a separate homogenous mixture in the following amounts, per 100 pts. of polyethylene: 0.74 pts. of the glycerides; 0.25 pt. castor wax; 0.1 pt. amorphous fumed silica; 0.1 pt. pigment, in this case to achieve a cranberry color, quinacridone violet and quinacridone red are used in equal amounts. 0.5 pts. silverflake and 0.1 pt. zinc stearate is added. This additive mixture is added to the polyethylene in the mold without further mixing. The mold halves are then closed and rotated about two axes in a heated oven at a temperature of approximately 500° F. for two timed cycles as follows:

The hot mold is rotated once vertically for every two rotations about the horizontal axis for two minutes. A second cycle of 4:1 (vertical:horizontal) rotation is then conducted for 13 minutes. The molds are then cooled in two separate 15-minute cycles as follows: the hot mold is pulled out of the oven and taken to a first cooling station where rotation of the mold is continued at the 4:1 cycle (vertical:horizontal) and cooled for 15 minutes by directing the flow of air from fans onto the mold casing. During this first cycle, the interior of the mold is pressurized at about 1–5 psi to maintain the integrity of the molded structure against the mold walls. After the end of the first 15 cooling minute cycle, the mold is moved to a station wherein a second cooling cycle the air pressure inside the mold is discontinued and the velocity of the air flow onto the mold is increased for nine minutes; a gentle spray of water is directed onto the mold for another four minutes; finally, the mold is dried by directing an air flow onto the mold for two minutes. The mold is then opened and the molded article is pulled out. The article at that point is colored cranberry, and noted to be strong, durable, and with metalflake evenly distributed both on the surface and throughout the thickness of the wall of the article.

EXAMPLE 2

The above procedure is followed, except a different pigment is used; here, a 1:1 mixture of ultramarine blue and phthalocynine blue are added in an amount equivalent to 0.1 pts. for every 100 pts. polyethylene. A blue article results, with metalflake evenly distributed both on the surface and throughout the thickness of the article wall.

From the foregoing description, it will be seen that the invention provides a rotationally molded article and a process for molding such article, wherein the articles are formed of low density polyethylene and additives including metalflake. By the method of the subject invention, the articles are characterized by having evenly distributed metalflake both on the surface of the article as well as throughout the thickness of the article wall, thereby providing a pleasing appearance.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments and equivalents falling within the scope of the appended claims.

Various features of the invention are set forth in the following claims.

What is claimed:

1. A method of rotationally molding an article for the even dispersal of metalflake in the article comprising the steps of:
   1) placing a measured amount of thermoplastic polymer in an open mold;
   2) placing a measured amount of homogeneous additive mixture in said open mold, said additive mixture comprising measured amounts of emulsifier, a dispersant, a translucent pigment, surfactant, and metalflake;
   3) closing said mold and heating said mold to a temperature of from about 400° F. to about 725° F.;
   4) rotating said heated mold once about the vertical axis for every two rotations about said horizontal axis and continuing said rotating in a first rotational period;
   5) rotating said heated mold about said vertical axis and about said horizontal axis in ratios of from 2:1 to 8:1 (vertical:horizontal) in a second rotational period dependent on the shape of said article being molded;
   6) pressurizing and cooling said mold with air flow while continuing rotation of the molded article; and
   7) opening said mold and removing the molded article.

2. The method of claim 1 wherein said thermoplastic polymer is linear low-density polyethylene.

3. The method of claim 1 wherein said additive mixture comprises glycerides, castor wax, amorphous fumed silica, pigment, zinc stearate, and coated aluminum foil particles.

4. The method of claim 1 wherein said cooling step includes cooling said mold with a water spray.

5. The method of claim 1 wherein said first rotational period is about two minutes long.

6. The method of claim 1 wherein said second rotational period is about 13 minutes long.

7. The method of claim 1 wherein Step 4 involves a speed of 1 rpm about said vertical axis and 2 rpm about said horizontal axis.

8. A method of rotationally molding an article for the even dispersal of metalflake in the article comprising the steps of:
   1) placing 100 pts. polyethylene in an open mold;
   2) mixing the following to achieve a homogeneous additive mixture:
      Glycerides: about 0.01–about 2.00 pts.
      Castor Wax: about 0.001–about 1.000 pts.
      Amorphous Fumed Silica: about 0.001–about 1.000 pts.
      Pigment: about 0.0–2.00 about pts.
      Metalflake: about 0.01–about 10.0 pts.
      Surfactant: about 0.02–about 0.20 pts;
   3) adding said additive mixture to said mold;
   4) closing, heating, and rotating said mold in two axes in a first rotational mode where the horizontal rotational speed is greater than the vertical rotational speed and in a second rotational mode where the vertical rotational speed is greater than the horizontal rotational speed;
   5) pressurizing and cooling said mold; and
   6) opening said mold and removing the molded article.

9. The method of claim 8 wherein said additive mixture comprises the following:
   Glycerides: 0.74 pts.
   Castor Wax: 0 0.25 pts.
   Amorphous Fumed Silica: 0.1 pts.
   Pigment: 0.1 pts.
   Metalflake: 0.5 pts.
   Surfactant: 0.1 pts.

10. The method of claim 8 wherein said first rotational mode is 1 vertical rotation for every 2 horizontal rotations.

11. The method of claim 8 wherein said first rotational mode is 1 rpm about said vertical axis and 2 rpm about said horizontal axis.

12. The method of claim 8 wherein said second rotational mode is 4 vertical rotations for every 1 horizontal rotations to 8 vertical rotations for every 1 horizontal rotation.

13. The method of claim 8 wherein said second rotational mode is 4 vertical rotations for every 1 horizontal rotations.

14. The method of claim 8 wherein in the cooling step, said mold is pressurized to about 5 psi.

15. The method of claim 8 wherein said glycerides includes a mixture of monoglycerides, biglycerides, and triglycerides.

16. The method of claim 15 wherein said mixture includes 5% triglycerides, 55% monoglycerides, and 40% diglycerides.

* * * * *